(12) United States Patent
Huang

(10) Patent No.: US 11,839,821 B2
(45) Date of Patent: Dec. 12, 2023

(54) RACING GAME OPERATION CONTROL METHOD AND APPARATUS, STORAGE MEDIUM, AND DEVICE

(71) Applicant: Tencent Technology (Shenzhen) Company Limited, Shenzhen (CN)

(72) Inventor: Xiongfei Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/325,040

(22) Filed: May 19, 2021

(65) Prior Publication Data

US 2021/0268390 A1    Sep. 2, 2021

Related U.S. Application Data

(63) Continuation of application No. PCT/CN2020/082310, filed on Mar. 31, 2020.

(30) Foreign Application Priority Data

Apr. 26, 2019 (CN) .......................... 201910346363.3

(51) Int. Cl.
*A63F 13/822* (2014.01)
*A63F 13/803* (2014.01)
(Continued)

(52) U.S. Cl.
CPC ............ *A63F 13/803* (2014.09); *A63F 13/52* (2014.09); *A63F 13/56* (2014.09)

(58) Field of Classification Search
CPC ........ A63F 13/803; A63F 13/52; A63F 13/56; A63F 13/42
See application file for complete search history.

(56) References Cited

U.S. PATENT DOCUMENTS 5,816,913 A * 10/1998 Nakamura .............. A63F 13/53
463/6
2005/0096110 A1* 5/2005 Ohyagi ................... A63F 13/56
463/6

(Continued)

FOREIGN PATENT DOCUMENTS

CN        103780694 A    5/2014
CN        106200944 A    12/2016
(Continued)

OTHER PUBLICATIONS

MKWiiHelp, Mario Kart Wii—Tutorial Drafting, Jan. 16, 2012, <https://www.youtube.com/watch?v=EkIWQiHqqHY> (Year: 2012).*

(Continued)

*Primary Examiner* — Chase E Leichliter
(74) *Attorney, Agent, or Firm* — Morgan, Lewis & Bockius LLP

(57) ABSTRACT

This application discloses an operation control method performed at a computer device. The method includes: detecting a target distance between a first virtual object and a second virtual object in a process that a client runs a round of racing game, a position of the first virtual object being located behind a position of the second virtual object, the first virtual object being controlled by the client; triggering an operation instruction when detecting that the target distance is continuously less than or equal to a first distance threshold for a first time threshold, the operation instruction being used for indicating that the first virtual object has satisfied a trigger condition for performing an acceleration operation; and responding to the operation instruction to control the first virtual object to perform the acceleration operation and surpass the second virtual object.

20 Claims, 9 Drawing Sheets

(51) Int. Cl.
 *A63F 13/52* (2014.01)
 *A63F 13/56* (2014.01)

(56) References Cited

U.S. PATENT DOCUMENTS

| | | | | |
|---|---|---|---|---|
| 2007/0078003 | A1* | 4/2007 | Sato | A63F 13/12 463/43 |
| 2008/0096623 | A1* | 4/2008 | Fujii | A63F 13/60 463/6 |
| 2008/0303790 | A1* | 12/2008 | Morimoto | A63F 13/807 345/157 |
| 2009/0005139 | A1* | 1/2009 | Morimoto | A63F 13/57 463/43 |
| 2009/0082112 | A1* | 3/2009 | Itskov | A63F 13/46 463/42 |
| 2011/0034226 | A1* | 2/2011 | Kuo | A63F 13/803 463/6 |
| 2011/0124409 | A1* | 5/2011 | Baynes | A63F 13/67 463/43 |
| 2011/0256912 | A1* | 10/2011 | Baynes | A63F 13/803 463/43 |
| 2012/0306854 | A1* | 12/2012 | Yamada | A63F 13/56 345/419 |
| 2014/0221062 | A1* | 8/2014 | Shinoda | A63F 13/847 463/6 |
| 2019/0030432 | A1* | 1/2019 | Catlin | A63F 13/50 |
| 2020/0206620 | A1* | 7/2020 | Hayashi | A63F 13/67 |
| 2021/0268390 | A1* | 9/2021 | Huang | A63F 13/35 |

FOREIGN PATENT DOCUMENTS

| | | | |
|---|---|---|---|
| CN | 108379836 A | | 8/2018 |
| CN | 108525303 A | | 9/2018 |
| CN | 110124307 A | | 8/2019 |
| JP | 2000140436 A | | 5/2000 |
| JP | 2008067938 A | | 3/2008 |
| JP | 2013031573 A | * | 2/2013 |
| JP | 2013031573 A | | 2/2013 |
| JP | 2016120131 A | | 7/2016 |
| JP | 2019051328 A | | 4/2019 |
| KR | 20180068725 A | | 6/2018 |
| WO | WO 2018216078 A1 | | 11/2018 |

OTHER PUBLICATIONS

Mario Kart Wiki, Drafting, 2019, <https://mariokart.fandom.com/wiki/Drafting> (Year: 2019).*

MKWiiHelp, Mario Kart Wii—Tutorial Drafting (Gameplay Video), Jan. 16, 2012, <https://www.youtube.com/watch?v=EkIWQiHqqHY> (Year: 2012) (Year: 2012).*

Chenjin852, "About Wake (Go Kart)", Dec. 4, 2017, 4 pgs., Retrieved from the Internet: https://tieba.baidu.com/p/5465682934?red_tag=2207014142.

"How to Start the Wake of Running Kart Marshmallow 9", Oct. 11, 2017, 2 pgs., Retrieved from the Internet: https://zhidao.baidu.com/question/1110712838247619139.html.

Tencent Technology, ISR, PCT/CN2020/082310, Jun. 30, 2020, 2 pgs.

Tencent Technology, WO, PCT/CN2020/082310, Jun. 30, 2020, 5 pgs.

Tencent Technology, IPRP, PCT/CN2020/082310, Sep. 28, 2021, 6 pgs.

"Kartrider Adds High-Output 'Cotton 9' Cart with 9th Generation Engine", BodNara, Sep. 5, 2014, 3 pgs., Retrieved from the Internet: https://www.bodnara.co.kr/bbs/article.html?num=112239.

Tencent Technology, Korean Office Action, KR Patent Application No. 10-2021-7032098, dated Aug. 21, 2023, 15 pgs.

Tom Orry, "Mario Kart 8 Deluxe Boost Tips—How to Slipstream, Jump Boost, Trick Boost", VG247, Dec. 18, 2017, 6 pgs., Retrieved from the Internet: https://www.vg247.com/mario-kart-8-deluxe-boost-tips-how-to-slipstream-jump-boost-trick-boost.

"Mario Kart 8 Wiki Guide, Drafting" May 1, 2017, 4 pgs., Retrieved from the Internet: https://www.ign.com/wikis/mario-kart-8/Drafting.

Tencent Technology, Singapore Office Action, SG Patent Application No. 11202111544W, dated Apr. 4, 2023, 11 pgs.

* cited by examiner

RACING GAME OPERATION CONTROL METHOD AND APPARATUS, STORAGE MEDIUM, AND DEVICE

CROSS-REFERENCE TO RELATED APPLICATIONS

This application is a continuation application of PCT Patent Application No. PCT/CN2020/082310, entitled "OPERATION CONTROL METHOD AND APPARATUS, STORAGE MEDIUM AND DEVICE" filed on Mar. 31, 2020, which claims priority to Chinese Patent Application No. 201910346363.3, filed with the State Intellectual Property Office of the People's Republic of China on Apr. 26, 2019, and entitled "OPERATION CONTROL METHOD AND APPARATUS, STORAGE MEDIUM, AND ELECTRONIC DEVICE", all of which are incorporated herein by reference in their entirety.

FIELD OF THE TECHNOLOGY

This application relates to the field of computers, and specifically, to an operation control technology.

BACKGROUND OF THE DISCLOSURE

In a game scene of a racing game application, the competition between virtual objects participating in a round of racing game is usually fierce. For example, oftentimes, a virtual object follows closely behind another virtual object in front. In this case, if the virtual object in front does not make a mistake, the virtual object behind can hardly overtake the virtual object in front.

That is, in an operation control method provided in the related art at present, for the foregoing racing, the two virtual objects maintain a positional relationship of one following the other in a subsequent game process, and it is difficult to truly recreate a competitive process with fierce competition in the game.

SUMMARY

Embodiments of this application provide an operation control method and apparatus, a storage medium, and a device, to change a subsequently maintained positional relationship of one virtual object following another, to implement a competitive process with fierce competition in a game.

According to an aspect of the embodiments of this application, an operation control method is provided, including: detecting a target distance between a first virtual object and a second virtual object in a process that a client runs a round of racing game, a position of the first virtual object being located behind a position of the second virtual object, the first virtual object being controlled by the client; triggering an operation instruction when detecting that the target distance is continuously less than or equal to a first distance threshold for a first time threshold, the operation instruction being used for indicating that the first virtual object has satisfied a trigger condition for performing an acceleration operation; and responding to the operation instruction to control the first virtual object to perform the acceleration operation and surpass the second virtual object.

According to another aspect of the embodiments of this application, an operation control apparatus is provided, including: a detection unit, configured to detect a target distance between a first virtual object and a second virtual object in a process that a client runs a round of racing game, a position of the first virtual object being located behind a position of the second virtual object, the first virtual object being controlled by the client; a trigger unit, configured to trigger an operation instruction when detecting that the target distance is continuously less than or equal to a first distance threshold for a first time threshold, the operation instruction being used for indicating that the first virtual object has satisfied a trigger condition for performing an acceleration operation; and a control unit, configured to respond to the operation instruction to control the first virtual object to perform the acceleration operation and surpass the second virtual object.

According to still another aspect of the embodiments of this application, a non-transitory computer-readable storage medium is further provided, the storage medium storing a plurality of computer programs, the computer programs being configured to perform, when being executed by a processor of a computer device, the foregoing operation control method.

According to still another aspect of the embodiments of this application, a computer device is further provided, including a memory, a processor, and a plurality of computer programs that are stored in the memory and executable on the processor, the processor performing the foregoing operation control method by using the computer programs.

According to still another aspect of the embodiments of this application, a computer program product including instructions is further provided, the instructions, when being run on a computer, causing the computer to perform the foregoing control method.

In the embodiments of this application, in a process that a client runs a round of racing game and when detecting that a target distance between a first virtual object and a second virtual object is less than or equal to a first distance threshold, an operation instruction is triggered, to control a first virtual object behind to perform an acceleration operation. Therefore, when the first virtual object satisfies a trigger condition, an execution process of the acceleration operation is triggered, to prevent the two virtual objects from maintaining a positional relationship of one following another in the subsequent game, and implement a competitive process with fierce competition in the game. In other words, control operations of the virtual objects are enriched by triggering the operation instruction, so that the virtual objects can implement a process with fierce competition in the game, rather than that the virtual objects merely maintain respective speeds until a round of racing game ends, thereby overcoming a problem of lack of realness in the game due to monotonous control operations performed on the virtual object in the related art. Moreover, based on a feature that the second virtual object in front may block the first virtual object behind, air resistance applied to the first virtual object is reduced. Therefore, a manner of performing the acceleration operation on the first virtual object behind produces a more realistic scene and is more acceptable to players.

BRIEF DESCRIPTION OF THE DRAWINGS

The accompanying drawings described herein are used for providing a further understanding of this application, and form a part of this application. Exemplary embodiments of this application and the description of the embodiments are used for explaining this application and do not constitute any inappropriate limitation to this application. In the accompanying drawings.

DESCRIPTION OF EMBODIMENTS

Figure 1:
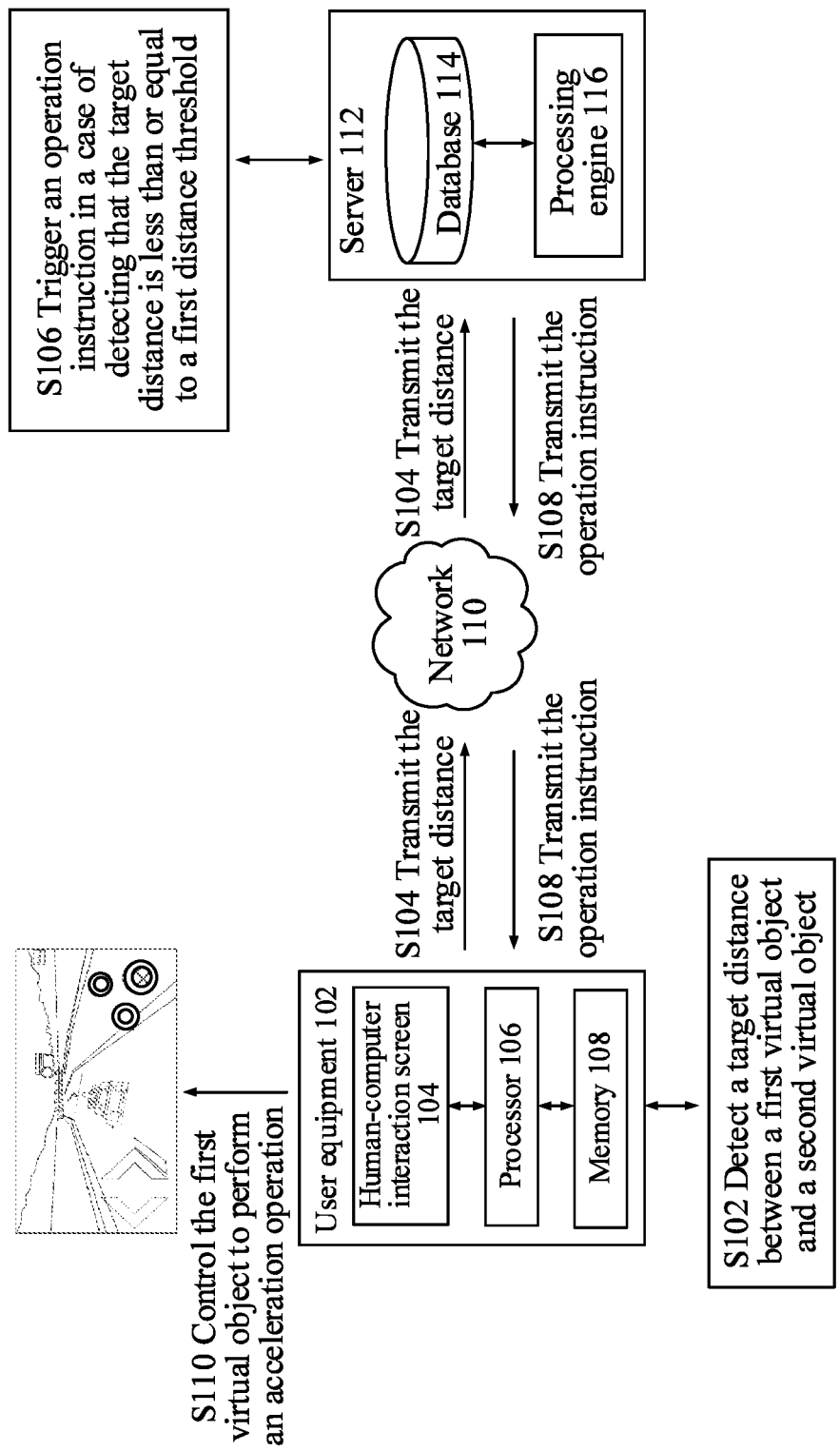
FIG. 1 is a schematic diagram of a network environment of an operation control method according to an embodiment of this application.

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, claims, and accompanying drawings of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to an aspect of the embodiments of this application, an operation control method is provided. In one implementation, the operation control method may be applicable to, but not limited to, an operation control system in a network environment shown in FIG. 1. The operation control system includes a user equipment 102, a network 110, and a server 112. It is assumed that a client of a game application (a client of a racing game application shown in FIG. 1) is installed on the user equipment 102. The user equipment 102 includes a human-computer interaction screen 104, a processor 106, and a memory 108. The human-computer interaction screen 104 is configured to detect a human-computer interaction operation (for example, a click operation or a tap operation) through a human-computer interaction interface corresponding to the client. The processor 106 is configured to generate a corresponding operation instruction according to the human-computer interaction operation, and respond to the operation instruction to control a virtual object controlled by the client to perform a corresponding action or operation. The memory 108 is configured to store the operation instruction and attribute information related to a target object. For example, the attribute information may include, but is not limited to, rendering effect information of the target object.

As shown in S102, in a running process of a round of racing game, the processor 106 in the user equipment 102 performs S102: Detect a target distance between a first virtual object controlled by a client and a second virtual object, a position of the first virtual object being located behind a position of the second virtual object. Subsequently, the user equipment 102 may perform S104: Transmit the target distance to the server 112 through the network 110. The server 112 includes a database 114 and a processing engine 116. The database 114 is configured to store a target distance, a first distance threshold, and the like. The processing engine 116 is configured to detect whether the target distance is continuously less than or equal to the first distance threshold, to determine whether to automatically trigger the operation instruction. The operation instruction is used for indicating that the first virtual object has satisfied a trigger condition for performing an acceleration operation.

Subsequently, the processing engine 116 in the server 112 invokes a threshold stored in the database 114 to perform S106: Detect whether the target distance is continuously less than or equal to the first distance threshold, and trigger the operation instruction when detecting that the target distance is continuously less than or equal to the first distance threshold. Step S108 is then performed: Transmit the operation instruction to the user equipment 102 through the network 110. Further, the processor 106 in the user equipment 102 performs S110: Control the first virtual object to perform an acceleration operation.

Figure 2:
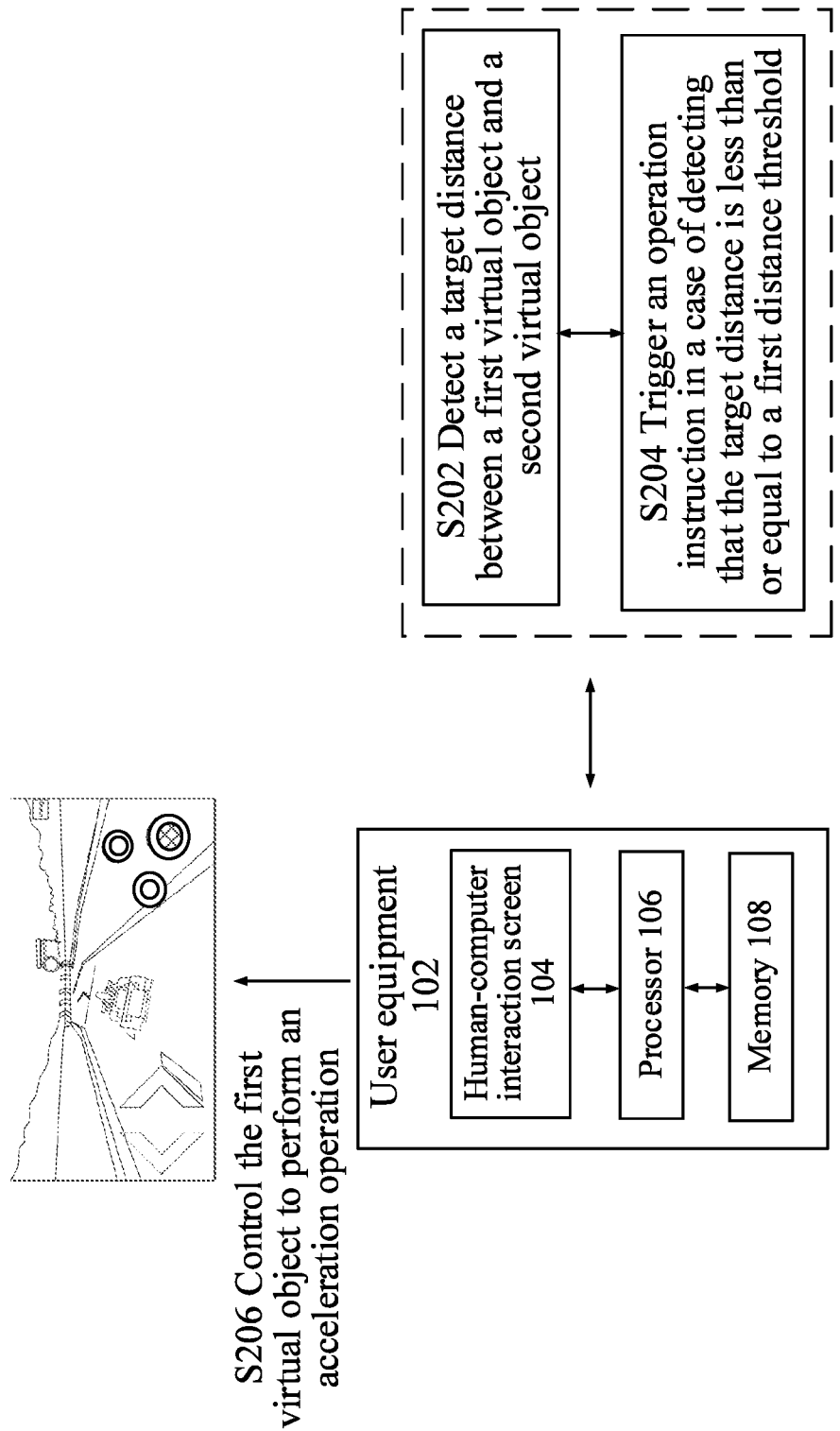
FIG. 2 is a schematic diagram of a hardware environment of an operation control method according to an embodiment of this application.

In addition, in one implementation, the operation control method is applicable to, but not limited to, a hardware environment shown in FIG. 2. It is still assumed that a client of a game application (a client of a racing game application shown in FIG. 2) is installed on the user equipment 102. The user equipment 102 includes the human-computer interaction screen 104, the processor 106, and the memory 108. The user equipment 102 performs S202 to S206 by using the processor 106: A target distance between a first virtual object controlled by a client and a second virtual object is detected, a position of the first virtual object being located behind a position of the second virtual object. Subsequently, it is detected whether the target distance is continuously less than or equal to the first distance threshold, and the operation instruction is triggered when detecting that the target distance is continuously less than or equal to the first distance threshold. The operation instruction is responded to control the first virtual object to perform the acceleration operation.

In this embodiment, in a running process of a round of racing game, a target distance between a first virtual object controlled by a client and a second virtual object is detected, a position of the first virtual object being located behind a position of the second virtual object. When detecting that the target distance is continuously less than or equal to the first distance threshold, the operation instruction used for indicating that the first virtual object has satisfied the trigger condition for performing the acceleration operation is triggered, and the operation instruction is responded to control the first virtual object to perform the acceleration operation. That is, in the process that the client runs a round of racing game and when detecting that the target distance between the first virtual object and the second virtual object is less than or equal to the first distance threshold, the operation instruction is triggered, to control the first virtual object behind to perform the acceleration operation. Therefore, when the first virtual object satisfies a trigger condition, an execution process of the acceleration operation is triggered, to prevent the two virtual objects from maintaining a positional relationship of one following another in the subsequent game, and implement a competitive process with fierce competition in the game. In other words, control operations of the virtual objects are enriched by triggering the operation instruction, so that the virtual objects can implement a process with fierce competition in the game, rather than that the virtual objects merely maintain respective speeds until a round of racing game ends, thereby overcoming a problem of lack of realness in the game due to monotonous control operations performed on the virtual object in the related art.

When the first virtual object travels behind the second virtual object, for the first virtual object, a region behind the second virtual object may be divided into a region (not blocked by the second virtual object) with relatively high air resistance and a region with relatively low air resistance (blocked by the second virtual object). Therefore, in some embodiments, the first virtual object may be located in the region with relatively low air resistance behind the second virtual object, to implement that the second virtual object in front blocks the first virtual object behind, thereby reducing the air resistance applied to the first virtual object. In this way, a manner of performing the acceleration operation on the first virtual object behind produces a more realistic scene and is more acceptable to players.

In one implementation, the user equipment may be, but is not limited to, a mobile phone, a tablet computer, a personal computer (PC), or another terminal device that supports running of an application client. The server and the user equipment may perform, but not limited to, data exchange with each other through the network, and the network may include, but not limited to, a wireless network or a wired network. The wireless network includes: Bluetooth, wireless fidelity (Wi-Fi), and another network implementing wireless communication. The wired network may include, but not limited to, a wide area network, a metropolitan area network, and a local area network. The foregoing description is merely an example, which is not limited in this embodiment.

Figure 3:
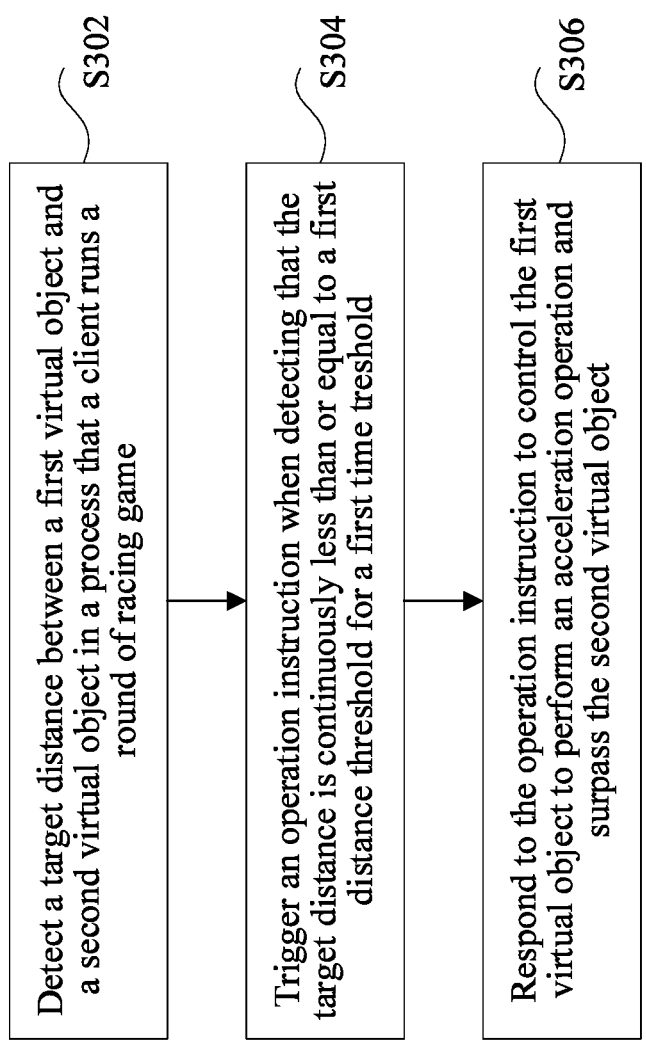
FIG. 3 is a flowchart of an operation control method according to an embodiment of this application.

In one implementation, as shown in FIG. 3, the foregoing operation control method includes the following steps:

S302. Detect a target distance between a first virtual object and a second virtual object in a process that a client runs a round of racing game, a position of the first virtual object being located behind a position of the second virtual object, the first virtual object being controlled by the client.

S304. Trigger an operation instruction when detecting that the target distance is less than or equal to a first distance threshold, the operation instruction being used for indicating that the first virtual object has satisfied a trigger condition for performing an acceleration operation.

S306. Respond to the operation instruction to control the first virtual object to perform the acceleration operation.

The steps of the method shown in FIG. 3 may be applicable to, but not limited to, the operation control system shown in FIG. 1, and are completed through data exchange between the user equipment 102 and the server 112, or may be applicable to, but not limited to, the user equipment 102 shown in FIG. 2, and are completed by using the user equipment 102 independently. The foregoing description is merely an example, which is not limited in this embodiment.

In one implementation, the operation control method may be applicable to, but not limited to, a scene for which virtual objects controlled by game application clients are automatically controlled. For example, the game application may be, but not limited to, a racing game application. The virtual objects may be, but not limited to, the virtual objects, for example, virtual characters, virtual equipment, and virtual vehicles operated by the players in the racing game application. The foregoing description is merely an example, which is not limited in this embodiment.

For example, it is assumed that the racing game application is used as an example. The operation instruction is triggered when detecting that the target distance between the first virtual object behind and the second virtual object in front is less than or equal to the first distance threshold. The operation instruction is responded to control the first virtual object behind to overtake the second virtual object in front through the acceleration operation, so that the first virtual object is controlled to perform the acceleration operation by triggering the operation instruction when detecting that a trigger condition is satisfied, and an effect of a racing process with fierce competition in the game is implemented.

In this embodiment, in the process that the client runs a round of racing game and when detecting that the target distance between the first virtual object and the second virtual object is less than or equal to the first distance threshold, the operation instruction is triggered, to control the first virtual object behind to automatically perform the acceleration operation. Therefore, when the first virtual object satisfies a trigger condition, an execution process of the acceleration operation is triggered, to prevent the two virtual objects from maintaining a positional relationship of one following another in the subsequent game, and implement a competitive process with fierce competition in the game. In other words, control operations of the virtual objects are enriched by triggering the operation instruction, so that the virtual objects can implement a process with fierce competition in the game, rather than that the virtual objects merely maintain respective speeds until a round of racing game ends, thereby overcoming a problem of lack of realness in the game due to monotonous control operations performed on the virtual object in the related art.

In one implementation, the acceleration operation may be, but not limited to, a continuous acceleration operation (also referred to as "wake flow" control) within a target time period, so that when the first virtual object satisfies the trigger condition, the acceleration operation is automatically triggered, to overtake the second virtual object in front through the acceleration operation, and in the related art, the positional relationship of the first virtual object remaining behind the second virtual object is changed. In this way, the process with fierce competition in an actual competition scene is recreated by improving the diversity of operation control.

In one implementation, the method for triggering the operation instruction in S304 may include:

triggering the operation instruction when detecting that the target distance is continuously less than or equal to the first distance threshold and when duration for which the target distance being less than or equal to the first distance threshold reaches a first time threshold.

In this embodiment, the trigger conditions may include, but not limited to, (1) it is detected that the target distance between the first virtual object and the second virtual object is less than or equal to the first distance threshold; (2) the duration for which the target distance being less than or equal to the first distance threshold reaches the first time threshold. That is, when the two trigger conditions are satisfied, an operation instruction for performing a control operation on the first virtual object is triggered, so that the first virtual object may automatically perform the acceleration operation to change a current positional relationship with the second virtual object.

Through the two trigger conditions, when the first virtual object satisfies a trigger condition, an execution process of the acceleration operation is triggered, to prevent the two virtual objects from maintaining a positional relationship of one following another, and implement a competitive process with fierce competition in the game.

Figure 4:
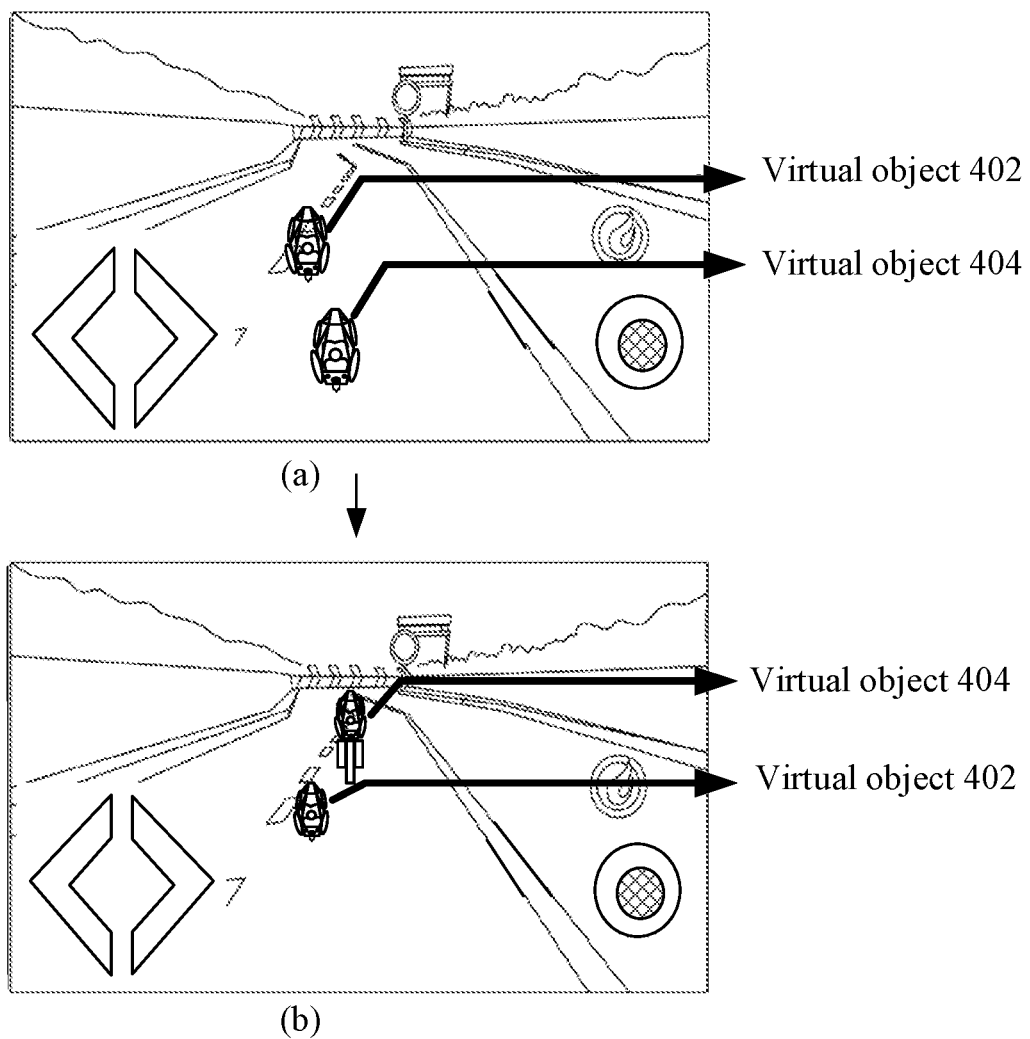
FIG. 4 is a schematic diagram of an operation control method according to an embodiment of this application.

For example, as shown in FIG. 4, it is assumed that a first virtual object controlled by a current client is a virtual object 404 shown in FIG. 4, and a second virtual object is a virtual object 402 shown in FIG. 4. As shown in FIG. 4(a), a position of the virtual object 404 is located behind a position of the virtual object 402. Further, assuming that it is detected that duration for which a target distance between the virtual objects being less than or equal to a first distance threshold reaches a first time threshold, an operation instruction is triggered, to control the virtual object 404 to perform an acceleration operation, to overtake the virtual object 402 in front. As shown in FIG. 4(b), after performing the acceleration operation, the position of the virtual object 404 is in front of the position of the virtual object 402. The foregoing description is merely an example, which is not limited in this embodiment.

In one implementation, the acceleration operation may be, but not limited to, controlled and implemented through a driving control force. That is, the first virtual object is controlled to perform the acceleration operation by adjusting the driving control force applied to the first virtual object. In this embodiment, when the trigger conditions are satisfied, the driving control force may be, but not limited to, increased according to a target ratio within a target time period, so that the first virtual object may continuously perform an acceleration operation within the target time period.

Moreover, in this embodiment, in a process of increasing the driving control force of the first virtual object according to the target ratio within the target time period, and when detecting that a set game aid item in a round of racing game generates a target force on the first virtual object and the target force is greater than an updated driving control force in the foregoing process, the updated driving control force is replaced with the target force, to act on the first virtual object, and a process of controlling the first virtual object to continuously perform the acceleration operation is stopped. The game aid item may include, but not limited to, an item or a mechanism that accelerates the first virtual object, an item or a mechanism that is provided by a teammate of the first virtual object and assists in accelerating the first virtual object, and the like. The foregoing description is merely an example, which is not limited in this embodiment.

In this embodiment, in a process of stopping the continuous acceleration operation in a background, a rendering effect of the acceleration operation may continue to be displayed on a picture displayed on the client until an end time of the target time period is reached. In this way, a switching control process of the foregoing force can be completed without perception of a user.

In one implementation, a round of racing game may include, but not limited to, at least two virtual objects. When a quantity of the virtual objects is equal to 2, it indicates that a round of racing game includes a first virtual object and a second virtual object. However, when a quantity of the virtual objects is greater than 2, it indicates that a round of racing game includes one first virtual object and at least two second virtual objects. When a quantity of the virtual objects is greater than 2, the following operations may be performed (however, this application is not limited thereto): determining positions of a plurality of virtual objects in front of the first virtual object, and determining object distances between the virtual objects and the first virtual object; sorting the object distances to obtain a distance sequence; and determining a virtual object with the smallest object distance from the first virtual object as the second virtual object. A target distance between the first virtual object and the determined second virtual object then starts to be detected. If it is detected that the target distance is less than or equal to a first distance threshold, an operation instruction is triggered, to control the first virtual object to perform an acceleration operation, to overtake the second virtual object with the smallest object distance from the first virtual object, and change a current positional relationship, thereby improving the diversity of a competitive game.

Figure 5:
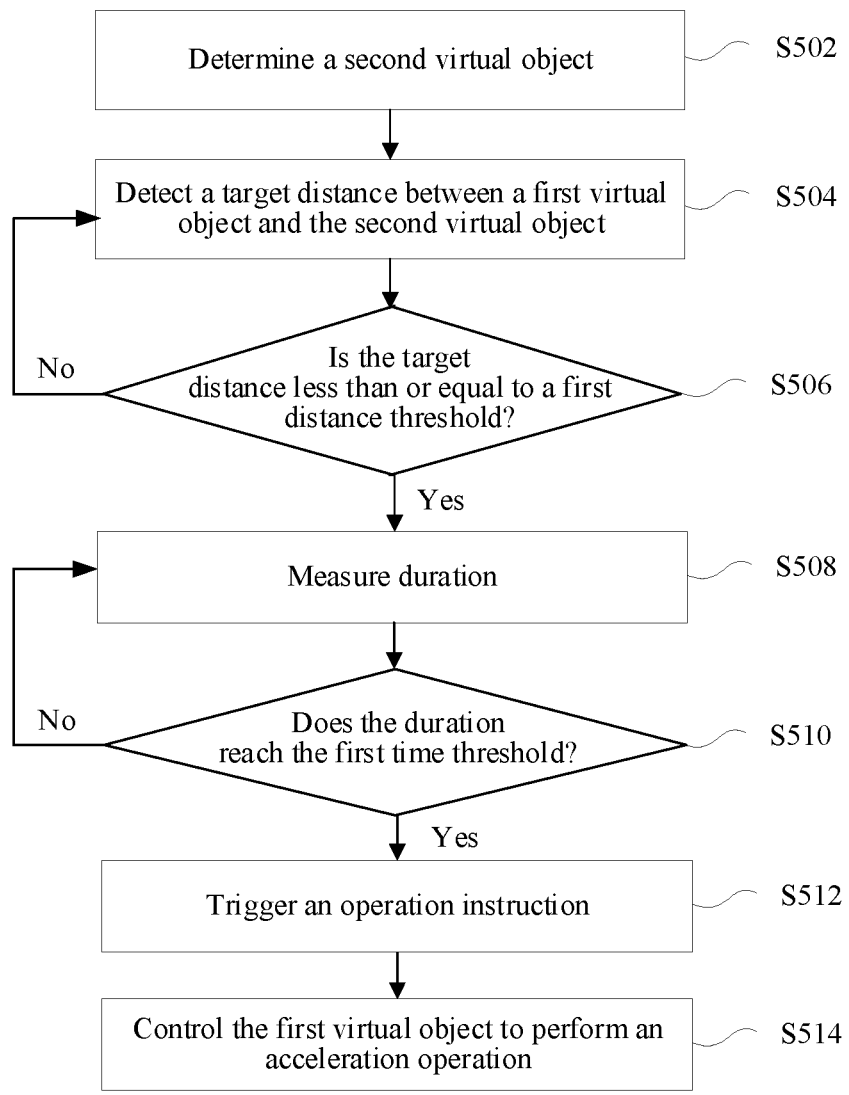
FIG. 5 is a flowchart of another operation control method according to an embodiment of this application.

Details are described with reference to S502 to S514 in FIG. 5. In a process that a client runs a round of racing game, it is assumed that a quantity of the virtual objects in the game is greater than 2, S502 is performed: Determine, from the plurality of virtual objects, a second virtual object with the smallest object distance from the first virtual object controlled by the client. S504 to S506 are then performed: Detect a target distance between a first virtual object and the determined second virtual object, and determine whether the target distance is continuously less than or equal to the first distance threshold. If it is determined that the target distance is continuously less than or equal to the first distance threshold, a timer is started, and S508 is performed: Measure duration. If it is determined that the target distance is greater than the first distance threshold, the process returns to S504 to re-detect the target distance between the first virtual object and the second virtual object. In addition, the process may alternatively return to S502 to re-determine the second virtual object (not shown in the figure).

Further, after the duration is measured in S508, S510 is performed: Determine whether the duration reaches the first time threshold. If it is determined that the duration reaches the first time threshold, S512 is performed: Trigger an operation instruction. If it is determined that the duration does not reach the first time threshold, the process returns to S508 to continue to measure the duration.

S514: If the operation instruction is triggered, control the first virtual object to perform an acceleration operation within a target time period according to the operation instruction, so that the positional relationship between the first virtual object and the second virtual object may be changed after the acceleration operation is performed, thereby overcoming a problem of violating the realness of game running because only one positional relationship can be maintained in the related art.

Through the embodiments of this application, in a process that a client runs a round of racing game and when detecting that duration for which a target distance between a first virtual object and a second virtual object being less than or equal to a first distance threshold reaches a first time threshold, an operation instruction is triggered, to control a first virtual object behind to automatically perform an acceleration operation. Therefore, when the first virtual object satisfies a trigger condition, an execution process of the acceleration operation is automatically triggered, to change a maintained positional relationship of one virtual object following another, and to truly recreate a competitive process with fierce competition in the game. In other words, automatic control operations of the virtual objects are enriched by triggering the operation instruction, so that the virtual objects can truly recreate a process with fierce competition in the game, rather than that the virtual objects merely maintain respective speeds until a round of racing game ends, thereby overcoming a problem of lack of realness in the game due to monotonous control operations performed on the virtual object in the related art.

In one implementation, after the detecting a target distance between a first virtual object and a second virtual object, the method further includes the following steps:

S1. Compare the detected target distance with the first distance threshold.

S2. Start a timer when the target distance is continuously less than or equal to the first distance threshold, the timer being used for measuring the duration for which the target distance is continuously less than or equal to the first distance threshold.

S3. Determine to trigger the operation instruction when the duration measured by the timer reaches the first time threshold.

In this embodiment, after the target distance between the first virtual object and the second virtual object is detected, the target distance may be compared with the first distance threshold, but this application is not limited thereto. When the target distance is continuously less than or equal to the first distance threshold, the timer is triggered again, to monitor whether the duration reaches the first time threshold. The first distance threshold and the first time threshold may be, but not limited to, flexibly configured according to actual application scenarios. This is not limited in this embodiment.

In one implementation, after the starting a timer, the method further includes: performing a reset operation on the timer when the duration does not reach the first time threshold but it is detected that the target distance is greater than the first distance threshold.

That is, in this embodiment, when detecting that the target distance satisfies a distance condition, the timer is then started to measure the duration. However, after being started, the timer still continuously detects the target distance. If it is detected that the target distance no longer satisfies the distance condition, the reset operation is performed on the timer, to continuously measure the duration for which the target distance satisfies the distance condition. Once the target distance does not satisfy the distance condition, the duration measured by the timer is no longer valid. Therefore, the reset operation is performed on the timer, to restart to measure duration for which the target distance satisfies the distance condition, thereby ensuring the accuracy of measurement, and further ensuring the accuracy of control triggered by the acceleration operation and avoiding misoperations.

Figure 6:
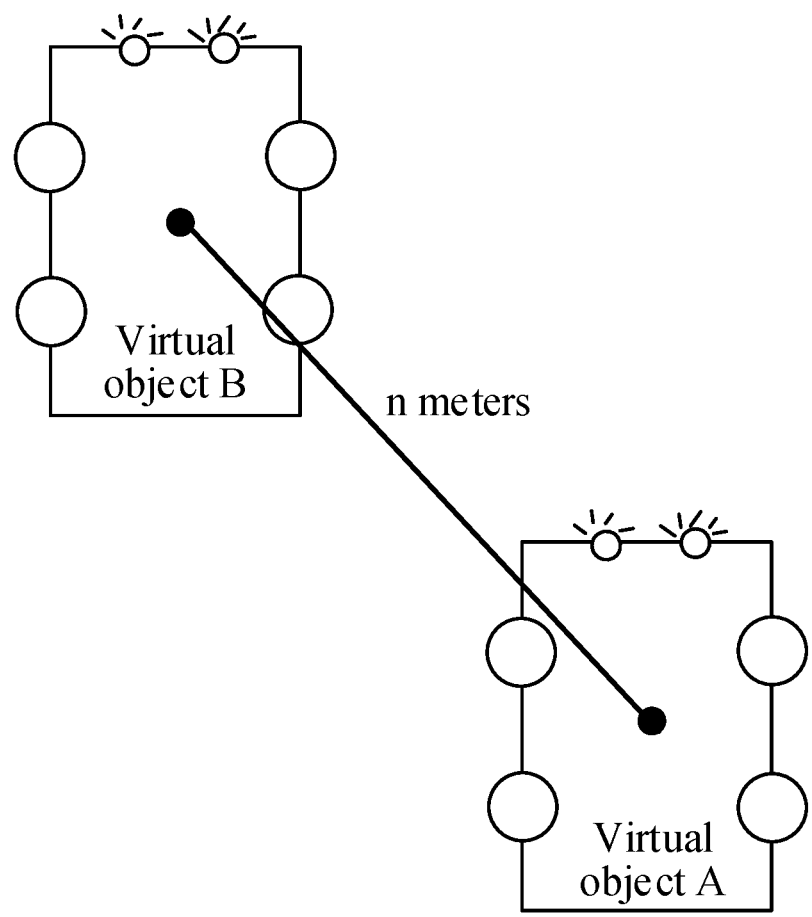
FIG. 6 is a schematic diagram of another operation control method according to an embodiment of this application.

Specifically, description is provided with reference to the example shown in FIG. 6. It is assumed that the first virtual object is a virtual object A, the second virtual object is a virtual object B, and a target distance (as shown in FIG. 6, a distance of a line connecting a center point of the virtual object A and a center point of the virtual object B) between the virtual objects is n meters. It is further assumed that a first distance threshold is S, and a first time threshold is 2 seconds.

If it is detected that the target distance n is less than the first distance threshold is S, the timer is started to start to measure duration. If the measured duration is 2.5 seconds and reaches the first time threshold of 2 seconds, an operation instruction used for indicating that the virtual object A has satisfied a trigger condition is triggered, so that the virtual object A is controlled to respond to the operation instruction to perform an acceleration operation, for example, a continuous acceleration operation. The acceleration operation is continuously performed for 1.5 seconds, so that the virtual object A can overtake the virtual object B in front.

Through the embodiments of this application, it is first detected whether a target distance satisfies a distance condition, and it is then detected whether duration satisfies a time condition, so that when a plurality of determining conditions are simultaneously satisfied, it is determined to trigger an operation instruction, to ensure the accuracy of triggering the operation instruction, avoid misoperations, and ensure operation accuracy and operation efficiency of controlling the first virtual object to perform the acceleration operation.

In one implementation, the responding to the operation instruction to control the first virtual object to perform the acceleration operation includes the following steps:

S1. Respond to the operation instruction to control the first virtual object to continuously perform the acceleration operation within a target time period.

In one implementation, in S1, the controlling the first virtual object to continuously perform the acceleration operation within a target time period includes the following steps:

S11. Determine a driving control force applied to the first virtual object when the operation instruction is triggered, the driving control force being used for controlling a travel speed of the first virtual object.

S12. Increase the driving control force of the first virtual object according to a target ratio within the target time period, to obtain an updated driving control force, the updated driving control force being used for controlling the first virtual object to continuously perform the acceleration operation.

Specifically, description is provided with reference to the following example. It is assumed that the first virtual object is a virtual object A, the second virtual object is a virtual object B, and a target distance (as shown in FIG. 6, a distance of a line connecting a center point of the virtual object A and a center point of the virtual object B) between the virtual objects is n meters. It is further assumed that a first distance threshold is S, and a first time threshold is 2 seconds.

When a position of the virtual object B is in front of a position of the virtual object A, the target distance between the virtual object B and the virtual object A is detected in real time. If the target distance n is less than or equal to the first distance threshold S, and duration reaches 2 seconds, it is determined that the virtual object A satisfies the trigger condition to perform the acceleration operation, and it is determined to trigger the operation instruction. Simultaneously, when it is determined to trigger the operation instruction, a driving control force (also referred to as driving power) $F_0$ applied to the virtual object A is obtained.

The operation instruction is then responded to control the virtual object A to perform the acceleration operation (for example, a continuous acceleration operation) within the target time period. Specifically, the virtual object A is controlled to perform the continuous acceleration operation by adjusting the driving control force applied to the virtual object A, to obtain an additional acceleration effect.

For example, a process of adjusting the driving control force applied to the virtual object A may include, but not limited to, increasing the driving control force according to a target ratio based on the driving control force $F_0$, to obtain an updated driving control force $F_1$:

$$F_1 = F_0 * (1 + a\%)$$

the target ratio a % may be, but not limited to, flexibly set according to actual application scenarios. This is not limited in this embodiment.

Through the embodiments of this application, a driving control force of a first virtual object is increased within a target time period according to a target ratio, to adjust driving power of the first virtual object in a racing process, so that the first virtual object may continuously perform an acceleration operation within the target time period, to ensure that the first virtual object can overtake a second virtual object in front, thereby changing a positional relationship that has been maintained, enriching operational diversity of a round of racing game, and truly recreating intensity of the competitive process.

In one implementation, a process of increasing the driving control force of the first virtual object according to a target ratio within the target time period, to obtain an updated driving control force further includes the following steps:
S1. Detect that a target force is applied to the first virtual object, the target force being a force generated by a game aid item set in a round of racing game on the first virtual object.
S2. Replace, when the target force is greater than the updated driving control force, the updated driving control force with the target force, to act on the first virtual object, and stop controlling the first virtual object to continuously perform the acceleration operation.

In this embodiment, the game aid item may include, but not limited to, an item or a mechanism that accelerates the first virtual object, an item or a mechanism that is provided by a teammate of the first virtual object and assists in accelerating the first virtual object, and the like. The foregoing description is merely an example, which is not limited in this embodiment.

That is, in a process that the first virtual object performs the acceleration operation to overtake the second virtual object, if another external force (for example, the target force) is applied to the first virtual object, the continuous acceleration operation may be stopped in a background. However, a rendering effect of the acceleration operation may continue to be displayed on a display screen until an end time of the target time period is reached.

Through the embodiments of this application, intervention in an execution process of the acceleration operation may be implemented through the target force, to increase operational diversity of a process of a round of racing game, and improve the fun of the competitive process, thereby attracting more participants to participate in the game.

In one implementation, before the detecting a target distance between a first virtual object and a second virtual object, the method further includes the following steps:
S1. Determine a position of each virtual object in front of the first virtual object in a round of racing game.
S2. Sequentially obtain an object distance between the virtual object and the first virtual object according to the position of the virtual object, to obtain a distance sequence.
S3. Determine, according to the distance sequence, a virtual object whose object distance is less than or equal to a second distance threshold as the second virtual object.

The second distance threshold may be, but not limited to, flexibly set according to actual application scenarios, so that a virtual object with the closest distance from the first virtual object is selected as the second virtual object.

Figure 7:
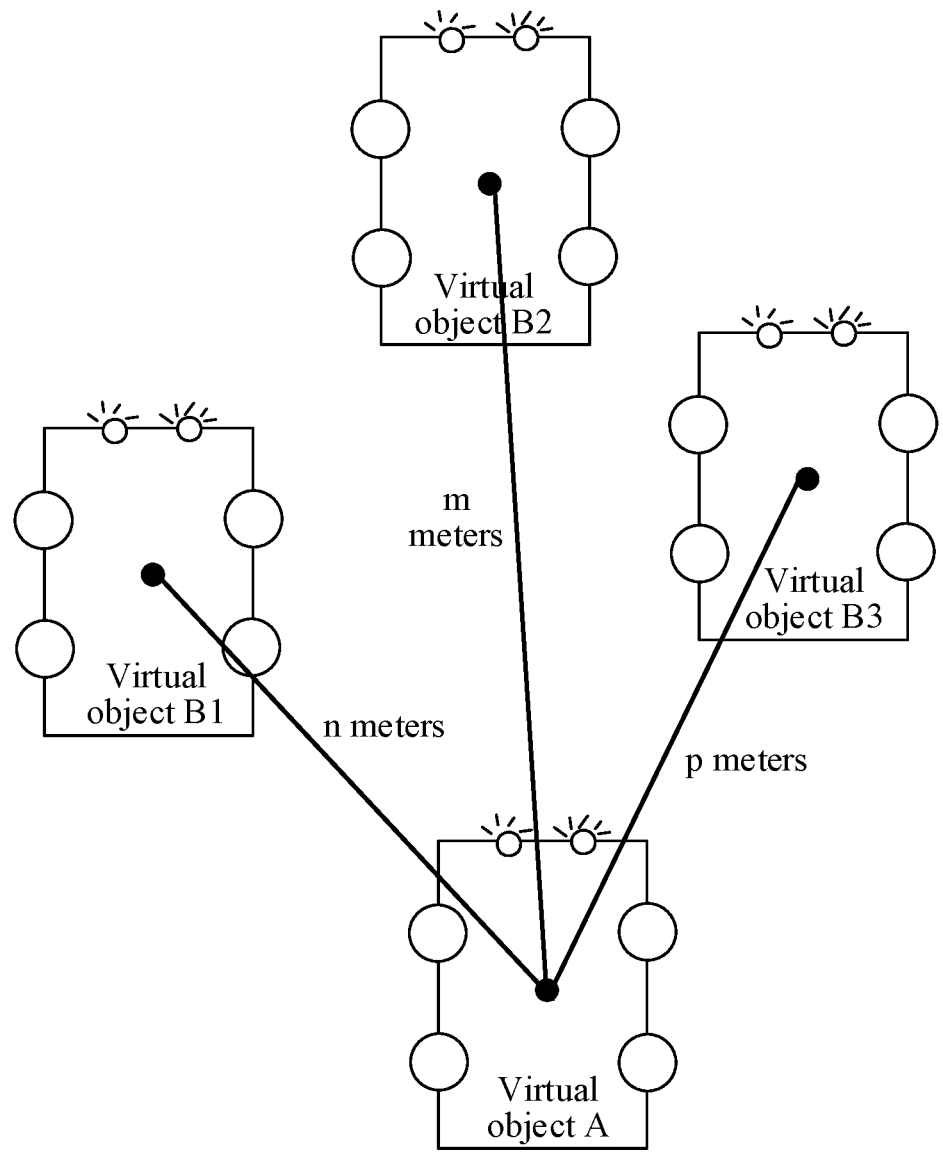
FIG. 7 is a schematic diagram of still another operation control method according to an embodiment of this application.

Specifically, description is provided with reference to the following example. As shown in FIG. 7, it is assumed that the first virtual object is a virtual object A, and it is determined that a plurality of virtual objects other than the first virtual object include a virtual object B1, a virtual object B2, and a virtual object B3. An object distance between the virtual object A and the virtual object B1 is n meters, an object distance between the virtual object A and the virtual object B2 is m meters, and an object distance between the virtual object A and the virtual object B3 is p meters. It is further assumed that a first distance threshold is S, and a first time threshold is 2 seconds.

Further, after the object distances are compared and sorted, a distance sequence n<p<m is obtained. According to the distance sequence, it is determined that the virtual object B1 is the closest to the virtual object A, and the virtual object B1 is determined as the second virtual object.

Subsequently, it is started to detect whether a target distance n between the virtual object A and the virtual object B1 is less than or equal to the first distance threshold S. If it is detected that the target distance n is less than or equal to the first distance threshold S, it is then detected whether duration reaches the first time threshold. When detecting that the duration is greater than the first time threshold, an operation instruction is triggered, to control the virtual object A to perform an acceleration operation within a target time period t1, to overtake the virtual object B1.

In this embodiment, within the target time period t1 for which the virtual object A is controlled to perform the continuous acceleration operation, any virtual object in front is no longer monitored. When an end time of the target time period t1 is reached, the positions of the plurality of virtual objects are re-obtained, to determine a new second virtual object with the closest distance from a current position of the first virtual object (the virtual object A).

Through the embodiments of this application, when a plurality of virtual objects are located in front of a first virtual object in a round of racing game, a second virtual object may be determined according to object distances between the virtual objects and the first virtual object, to make it convenient to detect whether the first virtual object and the second virtual object closest to the first virtual object satisfy the foregoing distance condition and time condition, and the first virtual object is triggered to perform an acceleration operation to overtake the second virtual object closest to the first virtual object rather than overtaking another virtual object relatively far away from the first virtual object, thereby achieving an objective of truly recreating a competitive process of the game.

In one implementation, the detecting a target distance between a first virtual object and a second virtual object includes the following steps:

S1. Obtain a linear distance between an object center coordinate of the first virtual object and an object center coordinate of the second virtual object as the target distance.

Figure 8:
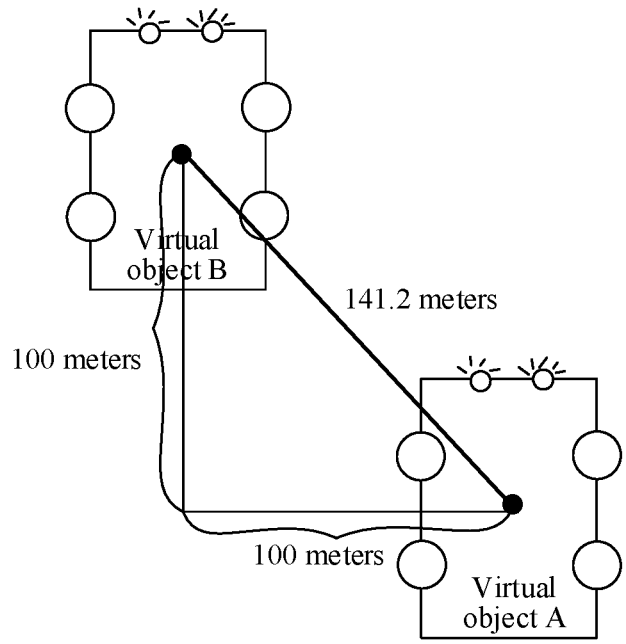
FIG. 8 is a schematic diagram of still another operation control method according to an embodiment of this application.

Specifically, description is provided with reference to the example shown in FIG. 8. It is assumed that the first virtual object is a virtual object A, and the second virtual object is a virtual object B. In a running process of a racing game, a real-time position of each racecar on a track is updated in every frame. In this embodiment, a world coordinate of a center position of an object of a virtual object may be used for representing a position of the virtual object, and this application is not limited thereto. Assuming that in a current frame in FIG. 8, a position of the virtual object B is (500, 700), and a position of the virtual object A is (600, 600). Further, according to the object center coordinates of the two virtual objects, it is calculated that a linear distance between the two virtual objects is 141.2 meters, and the linear distance is determined as the target distance between the virtual object A and the virtual object B.

The foregoing example is a calculation result of one frame. In a game scene, there are 60 frames per second, and the calculation is performed on each frame to determine in each frame whether the two virtual objects satisfy the trigger condition of triggering the operation instruction.

Through the embodiments of this application, the linear distance between the object center coordinate of the first virtual object and the object center coordinate of the second virtual object is determined as the target distance, to determine, based on the target distance, whether it is determined to trigger the operation instruction used for controlling the first virtual object to perform an acceleration operation.

In one implementation, when the target distance between the first virtual object and the second virtual object is detected, the method further includes the following steps:

S1. Render the first virtual object according to a first rendering effect when the target distance is continuously less than or equal to the first distance threshold, rendering duration of the first rendering effect being equal to the duration for which the target distance is continuously less than or equal to the first distance threshold.

S2. Render the first virtual object according to a second rendering effect when the duration for which the target distance being less than or equal to the first distance threshold reaches the first time threshold, the second rendering effect being stronger than the first rendering effect.

In one implementation, when detecting that the target distance is continuously less than or equal to the first distance threshold, it is started to perform rendering on the first virtual object according to a first rendering effect, to highlight the first virtual object and prompt that the first virtual object has satisfied the distance condition.

Figure 9:
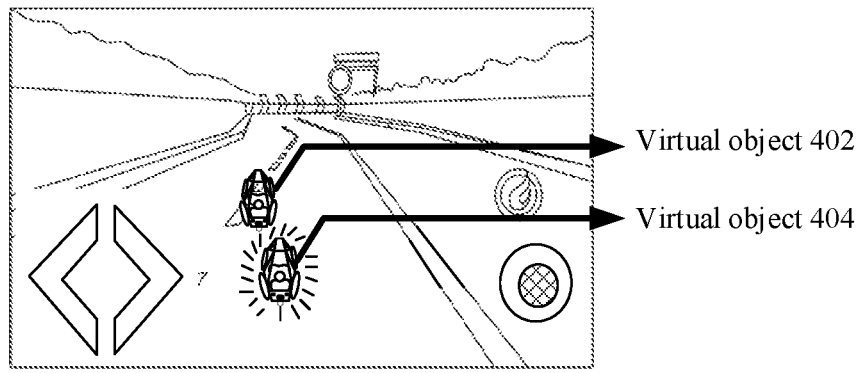
FIG. 9 is a schematic diagram of still another operation control method according to an embodiment of this application.

For example, as shown in FIG. 9, it is assumed that a first virtual object controlled by a current client is a virtual object 404 shown in FIG. 9, and a second virtual object is a virtual object 402 shown in FIG. 9. When a target distance between the virtual object 404 and the virtual object 402 is less than or equal to the first distance threshold, an energy-storing light effect (diverging light shown in FIG. 9) is rendered on the virtual object 404.

The rendering duration of the first rendering effect may be, but not limited to, equal to the duration for which the target distance is continuously less than or equal to the first distance threshold. For example, if the duration is 2 seconds, a corresponding first rendering effect (for example, the energy-storing light effect) of the virtual object is also maintained for 2 seconds.

Further, after the duration reaches 2 seconds, rendering may be performed according to a rendering effect corresponding to the next step, and this application is not limited thereto. For example, if the acceleration operation starts to be performed after the duration reaches 2 seconds, the rendering may be performed according to the second rendering effect (for example, rendering the virtual object, for example, the tail of the virtual object (for example, a rear engine) to show an explosive light effect). If the next operation indicates that the target distance is greater than the first distance threshold, the first rendering effect (for example, the energy-storing light effect) may disappear accordingly.

Figure 10:
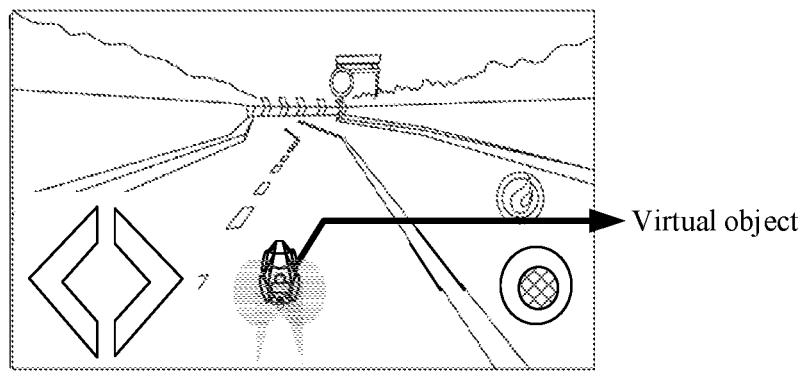
FIG. 10 is a schematic diagram of still another operation control method according to an embodiment of this application.

In one implementation, the tail of the first virtual object starts to be rendered according to the second rendering effect when the duration for which the target distance being less than or equal to the first distance threshold reaches the first time threshold, the second rendering effect having a stronger display effect than the first rendering effect. It is prompted that the first virtual object has satisfied both the distance condition and the time condition and satisfied the trigger condition, so that the operation instruction may be triggered. For example, the rendering effect may be shown in FIG. 10. The tail of the virtual object (for example, a rear engine) is rendered to show an explosive light effect. Simultaneously, the virtual object is controlled to continuously perform the acceleration operation within the target time period to overtake a virtual object in front.

Through the embodiments of this application, when the virtual object is in different states, the virtual object is controlled to render different rendering effects, thereby intuitively presenting the state of the virtual object according to the rendering effect, so that a player can learn state information of the virtual object in time.

In one implementation, in S306, a condition of responding to the operation instruction may include:
  responding to the operation instruction when the operation instruction is triggered. That is, a device that performs the operation control method automatically responds to the operation instruction. The manner can achieve a feature of fairly providing game players with acceleration functions.

In addition, in S306, a condition of responding to the operation instruction may further include: responding to the operation instruction when a feedback for the operation instruction is obtained. The feedback for the operation instruction may be determined according to an operation of a user. When the user intends to use the acceleration functions provided in the operation control method, the operation instruction may be controlled by a corresponding operation, to respond to the operation instruction by obtaining the feedback for the operation instruction. The manner may adaptively provide the players with acceleration functions according to requirements of the players.

For ease of description, the foregoing method embodiments are stated as a combination of a series of action combinations. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required to this application.

Figure 11:
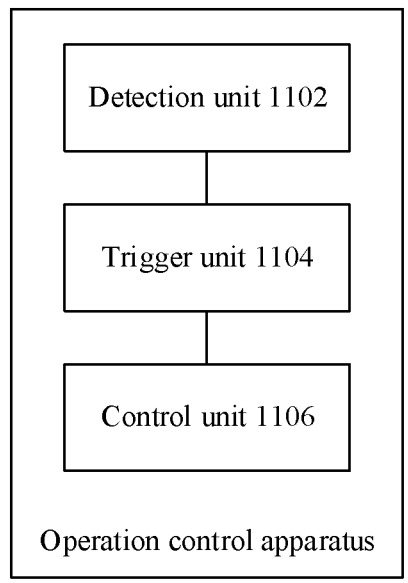
FIG. 11 is a schematic structural diagram of an operation control apparatus according to an embodiment of this application.

According to another aspect of the embodiments of this application, an operation control apparatus used for implementing the foregoing operation control method is further provided. As shown in FIG. 11, the apparatus includes:

(1) a detection unit 1102, configured to detect a target distance between a first virtual object and a second virtual object in a process that a client runs a round of racing game, a position of the first virtual object being located behind a position of the second virtual object, the first virtual object being controlled by the client;

(2) a trigger unit 1104, configured to trigger an operation instruction when detecting that the target distance is less than or equal to a first distance threshold, the operation instruction being used for indicating that the first virtual object has satisfied a trigger condition for performing an acceleration operation; and (3) a control unit 1106, configured to respond to the operation instruction to control the first virtual object to perform the acceleration operation.

The units shown in FIG. 11 may be located in, but not limited to, the user equipment 102 and the server 112 in the operation control system shown in FIG. 1, or may be located in, but not limited to, the user equipment 102 shown in FIG. 2. The foregoing description is merely an example, which is not limited in this embodiment. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In one implementation, the operation control apparatus may be applicable to, but not limited to, a scene for which virtual objects controlled by game application clients are automatically controlled. For example, the game application may be, but not limited to, a racing game application. The virtual objects may be, but not limited to, the virtual objects, for example, virtual characters, virtual equipment, and virtual vehicles operated by the players in the racing game application. The foregoing description is merely an example, which is not limited in this embodiment.

For example, it is assumed that the racing game application is used as an example. The operation instruction is triggered when detecting that the target distance between the first virtual object behind and the second virtual object in front is less than or equal to the first distance threshold. The operation instruction is responded to control the first virtual object behind to overtake the second virtual object in front through the acceleration operation, so that the first virtual object is controlled to perform the acceleration operation by triggering the operation instruction when detecting that a trigger condition is satisfied, and an effect of a racing process with fierce competition in the game is implemented.

Through the embodiments of this application, in a process that a client runs a round of racing game and when detecting that a target distance between a first virtual object and a second virtual object is less than or equal to a first distance threshold, an operation instruction is triggered, to control a first virtual object behind to perform an acceleration operation. Therefore, when the first virtual object satisfies a trigger condition, an execution process of the acceleration operation is automatically triggered, to prevent the two virtual objects from maintaining a positional relationship of one following another subsequently, and implement a competitive process with fierce competition in the game. In other words, control operations of the virtual objects are enriched by triggering the operation instruction, so that the virtual objects can implement a process with fierce competition in the game, rather than that the virtual objects merely maintain respective speeds until a round of racing game ends, thereby overcoming a problem of lack of realness in the game due to monotonous control operations performed on the virtual object in the related art. Moreover, based on a feature that the second virtual object in front may block the first virtual object behind, air resistance applied to the first virtual object is reduced. Therefore, a manner of performing the acceleration operation on the first virtual object behind produces a more realistic scene and is more acceptable to players.

In one implementation, the trigger unit 1104 is specifically configured to:

trigger the operation instruction when detecting that the target distance is continuously less than or equal to the first distance threshold and when duration for which the target distance being less than or equal to the first distance threshold reaches a first time threshold. In one implementation, the method further includes:

(1) a comparison unit, configured to compare the detected target distance with the first distance threshold after the target distance between the first virtual object and the second virtual object is detected;

(2) a starting unit, configured to start a timer when the target distance is continuously less than or equal to the first distance threshold, the timer being used for measuring the duration for which the target distance is continuously less than or equal to the first distance threshold; and (3) a first determining unit, configured to determine to trigger the operation instruction when the duration measured by the timer reaches the first time threshold.

In one implementation, the apparatus further includes: an operating unit, configured to perform, after the timer is started, a reset operation on the timer when the duration does not reach the first time threshold but it is detected that the target distance is greater than the first distance threshold.

Through the embodiments of this application, it is first detected whether a target distance satisfies a distance condition, and it is then detected whether duration satisfies a time condition, so that when a plurality of determining conditions are simultaneously satisfied, it is determined to trigger an operation instruction, to ensure the accuracy of triggering the operation instruction, avoid misoperations, and ensure operation accuracy and operation efficiency of controlling the first virtual object to perform the acceleration operation.

In one implementation, the control unit 1106 includes:

(1) a control module, configured to respond to the operation instruction to control the first virtual object to continuously perform the acceleration operation within a target time period.

In one implementation, the control module includes:

(1) a determining submodule, configured to determine a driving control force applied to the first virtual object when the operation instruction is triggered, the driving control force being used for controlling a travel speed of the first virtual object; and (2) an increase submodule, configured to increase the driving control force of the first virtual object according to a target ratio within the target time period, to obtain an updated driving control force, the updated driving control force being used for controlling the first virtual object to continuously perform the acceleration operation.

Through the embodiments of this application, a driving control force of a first virtual object is increased within a target time period according to a target ratio, to adjust driving power of the first virtual object in a racing process, so that the first virtual object may continuously perform an acceleration operation within the target time period, to ensure that the first virtual object can overtake a second virtual object in front, thereby changing a positional relationship that has been maintained, enriching operational diversity of a round of racing game, and truly recreating intensity of the competitive process.

In one implementation, the method further includes:

(1) a detection submodule, configured to detect, in a process of increasing the driving control force of the first virtual object according to a target ratio within the target time period, to obtain an updated driving control force, that a target force is applied to the first virtual object, the target force being a force generated by a game aid item set in a round of racing game on the first virtual object; and (2) a processing submodule, configured to: replace, when the target force is greater than the updated driving control force, the updated driving control force with the target force, to act on the first virtual object, and stop controlling the first virtual object to continuously perform the acceleration operation.

Through the embodiments of this application, intervention in an execution process of the acceleration operation may be implemented through the target force, to increase operational diversity of a process of a round of racing game, and improve the fun of the competitive process, thereby attracting more participants to participate in the game.

In one implementation, the method further includes:

(1) a second determining unit, configured to determine a position of each virtual object in front of the first virtual object in a round of racing game before the target distance between the first virtual object and the second virtual object is detected;

(2) an obtaining unit, configured to sequentially obtain an object distance between the virtual object and the first virtual object according to the position of the virtual object, to obtain a distance sequence; and (3) a third determining unit, configured to determine, according to the distance sequence, a virtual object whose object distance is less than or equal to a second distance threshold as the second virtual object.

The second distance threshold may be, but not limited to, flexibly set according to actual application scenarios, so that a virtual object with the closest distance from the first virtual object is selected as the second virtual object.

Through the embodiments of this application, when a plurality of virtual objects participate in a round of racing game, a second virtual object may be determined according to object distances between the virtual objects and a first virtual object, to make it convenient to detect whether the first virtual object and the second virtual object closest to the first virtual object satisfy the foregoing distance condition and time condition, and the first virtual object is triggered to perform an acceleration operation to overtake the second virtual object closest to the first virtual object rather than overtaking another virtual object relatively far away from the first virtual object, thereby achieving an objective of truly recreating a competitive process of the game.

In one implementation, the detection unit includes:

(1) an obtaining module, configured to obtain a linear distance between an object center coordinate of the first virtual object and an object center coordinate of the second virtual object as the target distance.

Through the embodiments of this application, the linear distance between the object center coordinate of the first virtual object and the object center coordinate of the second virtual object is determined as the target distance, to determine, based on the target distance, whether it is determined to trigger the operation instruction used for controlling the first virtual object to perform an acceleration operation.

In one implementation, the method further includes:

the control unit 1106, specifically configured to:

respond to the operation instruction when the operation instruction is triggered; or respond to the operation instruction when a feedback for the operation instruction is obtained.

In one implementation, the method further includes:

(1) a first rendering unit, configured to render, when the target distance between the first virtual object and the second virtual object is detected, the first virtual object according to a first rendering effect when the target distance is continuously less than or equal to the first distance threshold, rendering duration of the first rendering effect being equal to the duration for which the target distance is continuously less than or equal to the first distance threshold; and (2) a second rendering unit, configured to render the first virtual object according to a second rendering effect when the duration for which the target distance being less than or equal to the first distance threshold reaches the first time threshold, the second rendering effect being stronger than the first rendering effect.

Through the embodiments of this application, when the virtual object is in different states, the virtual object is controlled to render different rendering effects, thereby intuitively presenting the state of the virtual object according to the rendering effect, so that a player can learn state information of the virtual object in time.

Figure 12:
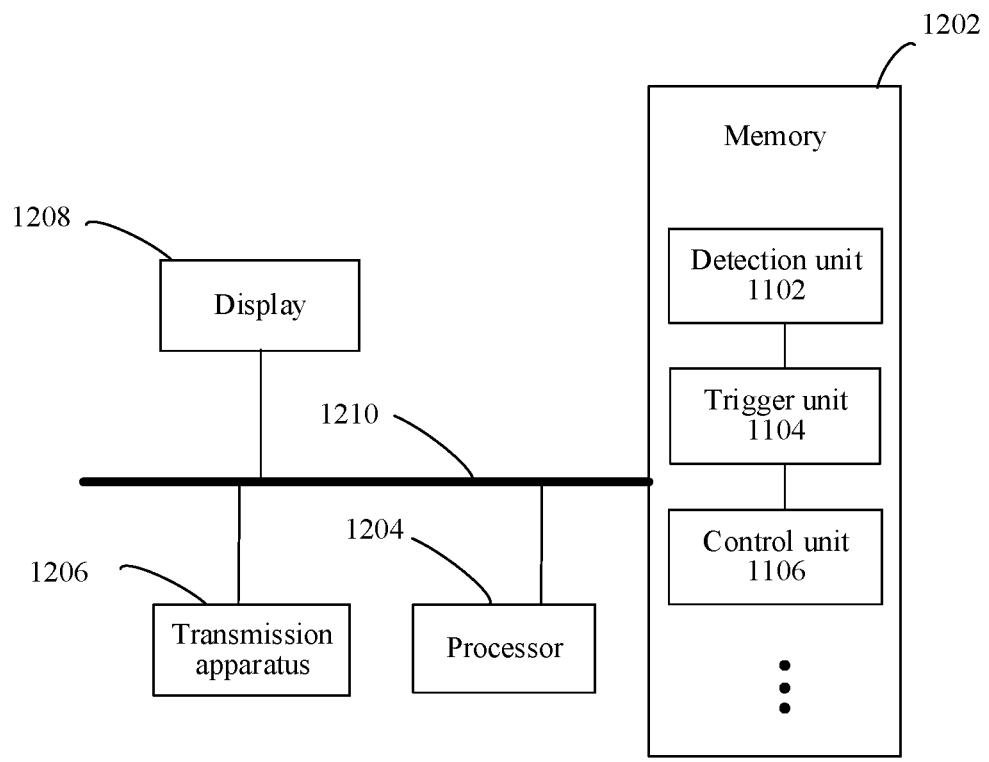
FIG. 12 is a schematic structural diagram of a device according to an embodiment of this application.

According to another aspect of the embodiments of this application, a device for implementing the foregoing operation control method is further provided. As shown in FIG. 12, the device includes a memory 1202 and a processor 1204. The memory 1202 stores a computer program, and the processor 1204 is configured to perform the steps in any one of the foregoing method embodiments by using the computer program.

In one implementation, the device may be at least one of a plurality of network devices in a computer network.

In one implementation, the processor may be configured to perform the following steps by using the computer program:

S1. Detect a target distance between a first virtual object and a second virtual object in a process that a client runs a round of racing game, a position of the first virtual object being located behind a position of the second virtual object, the first virtual object being controlled by the client.

S2. Trigger an operation instruction when detecting that the target distance is less than or equal to a first distance threshold, the operation instruction being used for indicating that the first virtual object has satisfied a trigger condition for performing an acceleration operation.

S3. Respond to the operation instruction to control the first virtual object to perform the acceleration operation.

In one implementation, a person of ordinary skill in the art may understand that the structure shown in FIG. 12 is merely an example, and the device may further be a terminal device such as a smartphone, for example, an Android mobile phone, or a mobile operating system (iPhone operation system (iOS)) mobile phone, a tablet computer (portable android device (PAD)), a palmtop computer, or a mobile Internet device (MID). FIG. 12 does not constitute a limitation on a structure of the device. For example, the device may further include more or fewer components (such as a network interface) than those shown in FIG. 12, or have a configuration different from that shown in FIG. 12.

The memory 1202 may be configured to store a software program and a module, for example, a program instruction/module corresponding to the operation control method and apparatus in the embodiments of this application, and the processor 1204 performs various functional applications and data processing by running a software program and a module stored in the memory 1202, that is, implementing the foregoing operation control method. The memory 1202 may include a high-speed random memory, and may also include a non-volatile memory, for example, one or more magnetic storage apparatuses, a flash memory, or another nonvolatile solid-state memory. In some embodiments, the memory 1202 may further include memories remotely disposed relative to the processor 1204, and the remote memories may be connected to a terminal through a network. Examples of the network include, but are not limited to, the Internet, an intranet, a local area network, a mobile communication network, and a combination thereof. The memory 1202 may specifically store, but is not limited to, information such as an operation instruction and rendering information. In an example, as shown in FIG. 12, the memory 1202 may, but is not limited to, include the detection unit 1102, the trigger unit 1104, and the control unit 1106 in the operation control apparatus. In addition, the memory may further include, but is not limited to, other module units in the operation control apparatus, and details are not described in this example again.

In one implementation, a transmission apparatus 1206 is configured to receive or transmit data through a network. Specific examples of the foregoing network may include a wired network and a wireless network. In an example, the transmission apparatus 1206 includes a network interface controller (NIC). The NIC may be connected to another network device and a router by using a network cable, to communicate with the Internet or a local area network. In an example, the transmission apparatus 1206 is a radio frequency (RF) module, which communicates with the Internet in a wireless manner.

In addition, the foregoing device further includes: a display 1208, configured to display virtual objects and an operation picture performed by the display; and a connection bus 1210, configured to connect various module components in the device.

According to still another aspect of the embodiments of this application, a storage medium is further provided. The storage medium stores a computer program, the computer program being configured to perform, when being run, steps in any one of the foregoing method embodiments.

In one implementation, the storage medium may be configured to store a computer program for performing the following steps:

S1. Detect a target distance between a first virtual object and a second virtual object in a process that a client runs a round of racing game, a position of the first virtual object being located behind a position of the second virtual object, the first virtual object being controlled by the client.

S2. Trigger an operation instruction when detecting that the target distance is less than or equal to a first distance threshold, the operation instruction being used for indicating that the first virtual object has satisfied a trigger condition for performing an acceleration operation.

S3. Respond to the operation instruction to control the first virtual object to perform the acceleration operation.

The embodiments of this application further provide a computer program product including instructions, the instructions, when being run on a computer, causing the computer to perform the method in any one of the foregoing method embodiments.

In one implementation, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of this application are merely for description purposes, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such understanding, the technical solutions of this application essentially, or some contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, descriptions of the embodiments have different emphases. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by using some interfaces, units, or modules, and may be electrical or of other forms.

The units described as separate components may or may not be physically separated, and the components displayed as units may or may not be physical units, that is, may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications shall fall within the protection scope of this application.

What is claimed is:

1. An operation control method performed at a computer device, the method comprising:
    detecting a target distance between a first virtual object and a second virtual object in a process that a client runs a round of racing game, a position of the first virtual object being located behind a position of the second virtual object, the first virtual object being controlled by the client;
    triggering an operation instruction when detecting that the target distance is continuously less than or equal to a first distance threshold for a first time threshold, the operation instruction being used for indicating that the first virtual object has satisfied a trigger condition for performing an acceleration operation; and
    responding to the operation instruction to control the first virtual object to perform the acceleration operation and surpass the second virtual object, wherein the acceleration operation further includes:
    determining a current driving control force applied to the first virtual object when the operation instruction is triggered;
    obtaining an updated driving control force based on the current driving control force of the first virtual object and a target ratio; and
    performing the acceleration operation on the first virtual object according to the updated driving control force until after the first virtual object surpasses the second virtual object.

2. The method according to claim 1, wherein the method further comprises:
    after detecting the target distance between the first virtual object and the second virtual object:
    comparing the detected target distance with the first distance threshold;
    starting a timer when the target distance is less than or equal to the first distance threshold, the timer being used for measuring a duration for which the target distance is continuously less than or equal to the first distance threshold; and
    determining to trigger the operation instruction when the duration measured by the timer reaches the first time threshold.

3. The method according to claim 2, wherein the method further comprises:
    after starting the timer, performing a reset operation on the timer when it is detected that the target distance is greater than the first distance threshold before the duration reaches the first time threshold.

4. The method according to claim 1, wherein the responding to the operation instruction to control the first virtual object to perform the acceleration operation comprises:
    responding to the operation instruction to control the first virtual object to continuously perform the acceleration operation within a target time period.

5. The method according to claim 1, wherein the performing the acceleration operation on the first virtual object according to the updated driving control force until after the first virtual object surpasses the second virtual object further comprises:
    detecting that a target force is applied to the first virtual object, the target force being a force generated by a game aid item set in the round of racing game on the first virtual object; and
    replacing, when the target force is greater than the updated driving control force, the updated driving control force with the target force, to act on the first virtual object, and stopping controlling the first virtual object to continuously perform the acceleration operation.

6. The method according to claim 1, wherein the method further comprises:
    before detecting the target distance between the first virtual object and the second virtual object:
    determining a position of each virtual object in front of the first virtual object in the round of racing game;
    sequentially obtaining an object distance between the virtual object and the first virtual object according to the position of the virtual object, to obtain a distance sequence; and
    determining, according to the distance sequence, a virtual object whose object distance is less than or equal to a second distance threshold as the second virtual object.

7. The method according to claim 1, wherein the detecting a target distance between a first virtual object and a second virtual object comprises:
    obtaining a linear distance between an object center coordinate of the first virtual object and an object center coordinate of the second virtual object as the target distance.

8. The method according to claim 1, wherein the detecting a target distance between a first virtual object and a second virtual object further comprises:
    rendering the first virtual object according to a first rendering effect when the target distance is less than or equal to the first distance threshold, rendering duration of the first rendering effect being equal to the duration for which the target distance is continuously less than or equal to the first distance threshold; and
    rendering the first virtual object according to a second rendering effect when the duration for which the target distance being less than or equal to the first distance threshold reaches the first time threshold, the second rendering effect being stronger than the first rendering effect.

9. A computer device, comprising a memory and a processor, the memory storing a plurality of computer programs that, when executed by the processor, cause the computer device to perform a plurality of operations including:

detecting a target distance between a first virtual object and a second virtual object in a process that a client runs a round of racing game, a position of the first virtual object being located behind a position of the second virtual object, the first virtual object being controlled by the client;

triggering an operation instruction when detecting that the target distance is continuously less than or equal to a first distance threshold for a first time threshold, the operation instruction being used for indicating that the first virtual object has satisfied a trigger condition for performing an acceleration operation; and responding to the operation instruction to control the first virtual object to perform the acceleration operation and surpass the second virtual object, wherein the acceleration operation further includes:

determining a current driving control force applied to the first virtual object when the operation instruction is triggered;

obtaining an updated driving control force based on the current driving control force of the first virtual object and a target ratio; and performing the acceleration operation on the first virtual object according to the updated driving control force until after the first virtual object surpasses the second virtual object.

10. The computer device according to claim 9, wherein the plurality of operations further comprise:
after detecting the target distance between the first virtual object and the second virtual object:
comparing the detected target distance with the first distance threshold;
starting a timer when the target distance is less than or equal to the first distance threshold, the timer being used for measuring a duration for which the target distance is continuously less than or equal to the first distance threshold; and
determining to trigger the operation instruction when the duration measured by the timer reaches the first time threshold.

11. The computer device according to claim 9, wherein the plurality of operations further comprise:
after starting the timer, performing a reset operation on the timer when it is detected that the target distance is greater than the first distance threshold before the duration reaches the first time threshold.

12. The computer device according to claim 9, wherein the responding to the operation instruction to control the first virtual object to perform the acceleration operation comprises:
responding to the operation instruction to control the first virtual object to continuously perform the acceleration operation within a target time period.

13. The computer device according to claim 9, wherein the performing the acceleration operation on the first virtual object according to the updated driving control force until after the first virtual object surpasses the second virtual object further comprises:
detecting that a target force is applied to the first virtual object, the target force being a force generated by a game aid item set in the round of racing game on the first virtual object; and
replacing, when the target force is greater than the updated driving control force, the updated driving control force with the target force, to act on the first virtual object, and stopping controlling the first virtual object to continuously perform the acceleration operation.

14. The computer device according to claim 9, wherein the plurality of operations further comprise:
before detecting the target distance between the first virtual object and the second virtual object:
determining a position of each virtual object in front of the first virtual object in the round of racing game;
sequentially obtaining an object distance between the virtual object and the first virtual object according to the position of the virtual object, to obtain a distance sequence; and
determining, according to the distance sequence, a virtual object whose object distance is less than or equal to a second distance threshold as the second virtual object.

15. The computer device according to claim 9, wherein the detecting a target distance between a first virtual object and a second virtual object comprises:
obtaining a linear distance between an object center coordinate of the first virtual object and an object center coordinate of the second virtual object as the target distance.

16. The computer device according to claim 9, wherein the detecting a target distance between a first virtual object and a second virtual object further comprises:
rendering the first virtual object according to a first rendering effect when the target distance is less than or equal to the first distance threshold, rendering duration of the first rendering effect being equal to the duration for which the target distance is continuously less than or equal to the first distance threshold; and
rendering the first virtual object according to a second rendering effect when the duration for which the target distance being less than or equal to the first distance threshold reaches the first time threshold, the second rendering effect being stronger than the first rendering effect.

17. A non-transitory computer-readable storage medium, storing a plurality of computer programs that, when being executed by a processor of a computer device, cause the computer device to perform a plurality of operations including:
detecting a target distance between a first virtual object and a second virtual object in a process that a client runs a round of racing game, a position of the first virtual object being located behind a position of the second virtual object, the first virtual object being controlled by the client;
triggering an operation instruction when detecting that the target distance is continuously less than or equal to a first distance threshold for a first time threshold, the operation instruction being used for indicating that the first virtual object has satisfied a trigger condition for performing an acceleration operation; and
responding to the operation instruction to control the first virtual object to perform the acceleration operation and surpass the second virtual object, wherein the acceleration operation further includes:
determining a current driving control force applied to the first virtual object when the operation instruction is triggered;
obtaining an updated driving control force based on the current driving control force of the first virtual object and a target ratio; and performing the acceleration operation on the first virtual object according to the updated driving control force until after the first virtual object surpasses the second virtual object.

18. The non-transitory computer-readable storage medium according to claim 17, wherein the plurality of operations further comprise:
　　after detecting the target distance between the first virtual object and the second virtual object:
　　comparing the detected target distance with the first distance threshold;
　　starting a timer when the target distance is less than or equal to the first distance threshold, the timer being used for measuring a duration for which the target distance is continuously less than or equal to the first distance threshold; and
　　determining to trigger the operation instruction when the duration measured by the timer reaches the first time threshold.

19. The non-transitory computer-readable storage medium according to claim 17, wherein the responding to the operation instruction to control the first virtual object to perform the acceleration operation comprises:
　　responding to the operation instruction to control the first virtual object to continuously perform the acceleration operation within a target time period.

20. The non-transitory computer-readable storage medium according to claim 17, wherein the performing the acceleration operation on the first virtual object according to the updated driving control force until after the first virtual object surpasses the second virtual object further comprises:
　　detecting that a target force is applied to the first virtual object, the target force being a force generated by a game aid item set in the round of racing game on the first virtual object; and
　　replacing, when the target force is greater than the updated driving control force, the updated driving control force with the target force, to act on the first virtual object, and stopping controlling the first virtual object to continuously perform the acceleration operation.

* * * * *